United States Patent [19]
O'Meara

[11] Patent Number: 6,095,349
[45] Date of Patent: Aug. 1, 2000

[54] KNOCK-DOWN HOIST

[75] Inventor: Richard Vincent O'Meara, Newburyport, Mass.

[73] Assignee: ORM Consulting, Inc., Newburyport, Mass.

[21] Appl. No.: 09/327,740

[22] Filed: Jun. 8, 1999

[51] Int. Cl.[7] ................................................ B60P 1/54
[52] U.S. Cl. ........................... 212/180; 212/293; 212/225
[58] Field of Search ................................. 212/180, 292, 212/200, 201, 202, 203, 204, 901, 225; 5/87.1; 414/462, 543; 224/519, 521

[56] References Cited

U.S. PATENT DOCUMENTS

| | | | |
|---|---|---|---|
| 274,527 | 3/1883 | Stelle et al. ................................. | 5/87.1 |
| 2,369,816 | 2/1945 | Crawford ................................. | 212/204 |
| 2,772,799 | 12/1956 | Bridinger ................................. | 414/462 |
| 2,858,946 | 11/1958 | Breed ................................. | 212/202 |
| 2,974,809 | 3/1961 | Sellars et al. ................................. | 212/203 |
| 3,084,808 | 4/1963 | Peduzzi et al. ................................. | 212/901 |
| 3,661,274 | 5/1972 | Woodside et al. ................................. | 212/68 |
| 3,711,877 | 1/1973 | Averill ................................. | 5/87.1 |
| 3,804,263 | 4/1974 | Castonguay ................................. | 212/65 |
| 3,836,024 | 9/1974 | Mantino ................................. | 214/75 H |
| 3,854,594 | 12/1974 | Brookes ................................. | 212/56 |
| 3,952,893 | 4/1976 | Kolesar ................................. | 214/450 |
| 4,213,729 | 7/1980 | Cowles et al. ................................. | 414/462 |
| 4,381,069 | 4/1983 | Kreck ................................. | 224/42.44 |
| 4,406,574 | 9/1983 | Riley ................................. | 414/543 |
| 4,419,038 | 12/1983 | Pendergraft ................................. | 414/543 |
| 4,463,858 | 8/1984 | Bilas ................................. | 212/176 |
| 4,508,233 | 4/1985 | Helms ................................. | 212/182 |
| 4,643,320 | 2/1987 | Larsen ................................. | 212/180 |
| 4,671,731 | 6/1987 | Harlan ................................. | 414/550 |
| 4,806,063 | 2/1989 | York ................................. | 414/462 |
| 4,881,864 | 11/1989 | Amato ................................. | 414/543 |
| 5,004,133 | 4/1991 | Wyers ................................. | 224/519 |
| 5,029,717 | 7/1991 | Chambers et al. ................................. | 212/231 |
| 5,064,078 | 11/1991 | Van Staveren ................................. | 212/901 |
| 5,090,580 | 2/1992 | Nelson ................................. | 212/180 |
| 5,211,526 | 5/1993 | Robinette ................................. | 414/550 |
| 5,269,501 | 12/1993 | Liegel et al. ................................. | 212/901 |
| 5,281,078 | 1/1994 | Mills, Jr. ................................. | 414/680 |
| 5,439,343 | 8/1995 | Watson ................................. | 414/744.3 |
| 5,615,904 | 4/1997 | Van Dusen et al. ................................. | 224/521 |
| 5,749,697 | 5/1998 | Davis ................................. | 212/253 |

*Primary Examiner*—Thomas J. Brahan
*Attorney, Agent, or Firm*—Hamilton, Brook, Smith & Reynolds, P.C.

[57] ABSTRACT

A knock-down portable hoist comprising a first member attachable to a support member, the first member supported substantially vertically by the support member, a second member insertable into and rotatably substantially vertically by the first member, such that the second member is rotatable about its longitudinal axis. The hoist further includes a boom member attachable to the second member, such that the boom member is supported substantially horizontally. An adjustable member is further provided which is movable along the longitudinal axis of the boom member and supported thereby. A hand-crankable winch assembly is further provided connectable to the second member for winding/unwinding a cable attached thereto. The cable is inserted through the boom member and through the adjustable for raising and lowering loads attached to the cable.

15 Claims, 4 Drawing Sheets

KNOCK-DOWN HOIST

BACKGROUND OF THE INVENTION

Vehicle hoists, which are used to load/unload objects onto/from a vehicle, have recently become popular. Typically, a hoist comprises a vertical member, a boom member supported by the vertical member which sustains the loads, and a winch mechanism for raising and lowering the object. Prior art designs, such as disclosed in U.S. Pat. No. 3,854,594 to Brookes and U.S. Pat. No. 4,881,864 to Amato, have failed to provide a hoist which is portable (i.e., knock-down), such that even the frailest user can effectively operate the hoist.

Another desirable feature that is lacking in prior art solutions is the ability to adjust the effective length of the boom member, which is desirable due to where the load is loaded or unloaded relative to the vehicle.

SUMMARY OF THE INVENTION

Accordingly, a need exists for a knock-down portable hoist which can be easily assembled.

A need also exists for a portable hoist in which the effective length of the boom member is adjustable.

The present invention provides a knock-down portable hoist which includes a first member attachable to a support member wherein the first member is supported substantially vertically by the support member. In one embodiment of the invention, the support member includes an insert member insertable into a trailer hitch pipe of a vehicle. In another embodiment the support member includes a bumper of a vehicle.

The hoist further includes a second member insertable into and rotatably supported substantially vertically by the first member, such that the second member is rotatable about its longitudinal axis. A boom member is attachable to the second member, such that the boom member is supported substantially horizontally. An adjustable member is guidably supported by the boom member, such that the adjustable member is movable along the longitudinal axis of the boom member.

A hand crankable winch assembly is connectable to the second member for winding/unwinding a cable attached to the winch assembly. In one embodiment of the present invention, the cable is insertable through the boom member and through the adjustable member for raising and lowering loads attached to the cable.

According to other aspects of the invention, the first member includes an externally threaded bolt insertable through a hole in the support member and further includes a handle lock having an internally threaded portion which threadedly engages the external threads of the bolt.

According to further aspects of the invention, a locking pin is provided for preventing rotation of the second member about its longitudinal axis. The first member can include a storage hole for storing locking pin when the locking pin is not in use.

According to yet another aspect of the invention, a locking pin is provided insertable through the second member for adjusting the height of the second member. An interface member that supports the weight of the second member on the first member includes a recess that removably secures a locking pin.

According to still further aspects of the invention, the adjustable member is clampable along the longitudinal axis of the boom member to change the effective length thereof.

The adjustable member may also include a wheel to guidably support the cable. The boom member can also include a pair of tracks positioned along the longitudinal axis thereof, in which case the adjustable member includes a pair of opposed bearings which ride along the tracks, such that the adjustable member travels along the longitudinal axis of the boom member.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
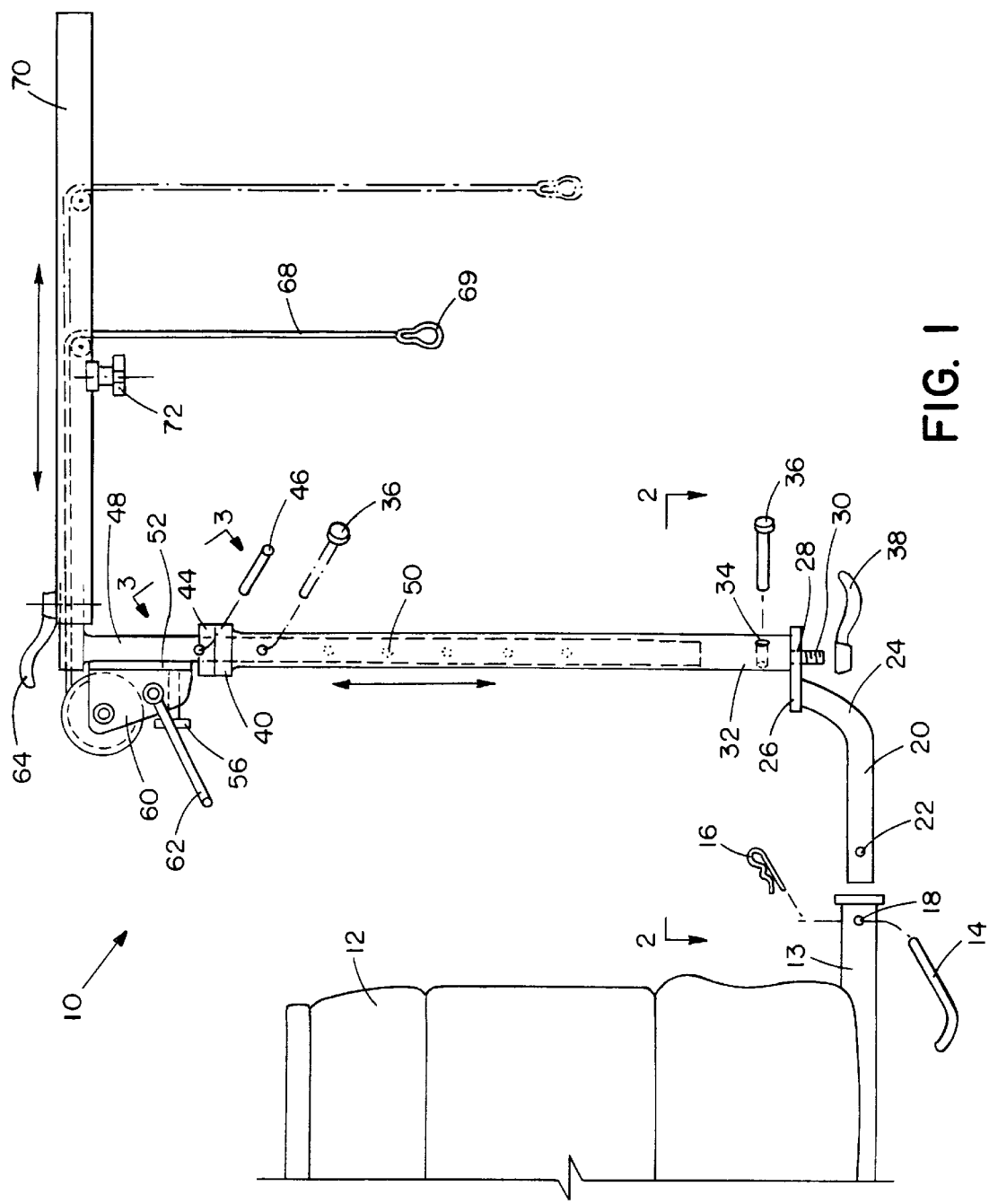
FIG. 1 is a partially cut away side view illustrating the knock-down portable hoist of the present invention.

Turning to the figures, the hoist 10 of the present invention is shown in detail in FIG. 1. The hoist 10 is preferably mountable to existing hardware structures presently found on vehicles. In a preferred embodiment of the present invention, a hitch member 20 is insertable into a conventional box beam trailer hitch pipe 13 which resides on a vehicle 12. Hitch member 20 includes a hole 22 to receive a locking member 14 which is insertable through a hole 18 of trailer hitch pipe 13 and locked therein by cotter key 16. Hitch member 20 includes an upwardly extending portion 24 which supports shoulder member 26. Shoulder member 26 includes a hole 28 therethrough for receiving an externally threaded bolt 30 of member 32. A handle lock 38 includes an internally threaded portion for threadedly engaging the external threads of the bolt. In one embodiment of the present invention, member 32 is supported by shoulder 26 substantially vertically.

Figure 3:
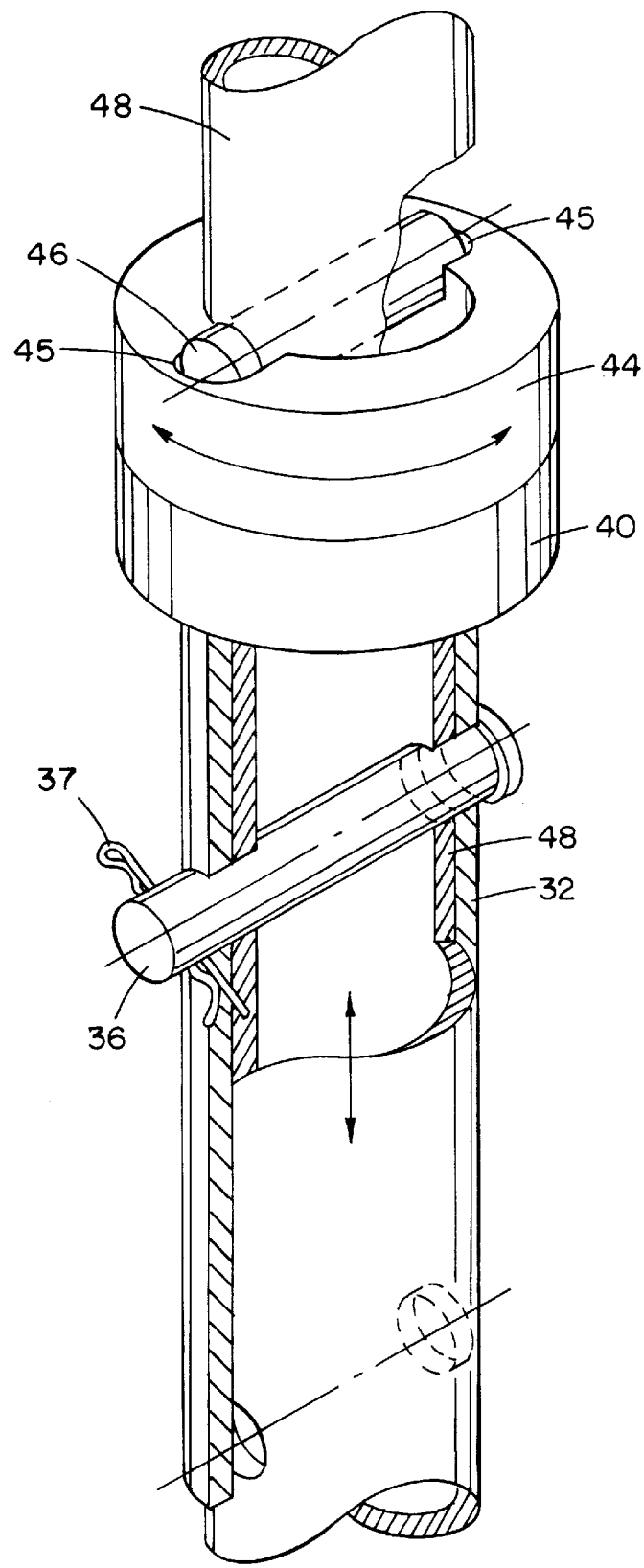
FIG. 3 is a partially cut away perspective view taken along line 3—3 of FIG. 1.

In another embodiment of the invention, the externally threaded bolt 30 is insertable through a hole in the bumper of the vehicle which typically receives a ball for towing trailers and the like. As more particularly illustrated in FIG. 3, member 32 terminates at the upper end in an annular flange 40. Flange 40 supports an annular shaped interface member 44 which in a preferred embodiment comprises Delrin® or other suitable friction free matterial. Delrin® is a registered trademark of the EI DuPont de Nemours & Company. Interface member 44 rotatably supports support member 48 thereon. Member 32 is hollow so as to receive support member 48 therein and to allow rotation of the support member about its longitudinal axis.

A locking pin 36 is provided to prevent rotation of the support member 48 and is removably secured through the support member 48 and member 32 by a cotter pin 37. When locking pin 36 is not in use, it can be stored in a storage hole 34 in member 32. Support member 48 includes holes 50 for adjusting the height of the support member. A pin 46 is insertable through holes 50 and secured by pockets or recesses 45 in interface member 44 for adjusting the height of support member 48.

Figure 2:
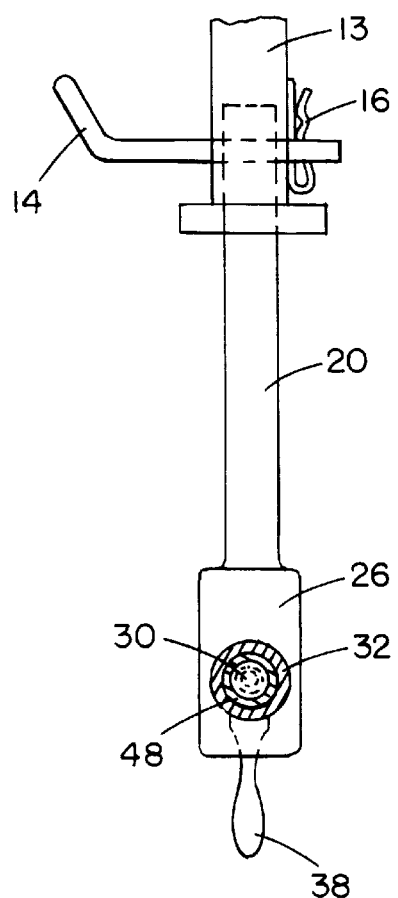
FIG. 2 is a top view taken along lines 2—2 of FIG. 1, illustrating a support member of the hoist illustrated in FIG. 1.

FIG. 2 illustrates the hitch member 20 inserted into the hitch pipe 13 and secured therein by locking member 14 and cotter pin 16. In this embodiment, hitch member has a rectangular cross section where it inserts into the hitch member to prevent rotation about its longitudinal axis. FIG. 2 also illustrates the support member 48 placed within member 32.

Figure 4:
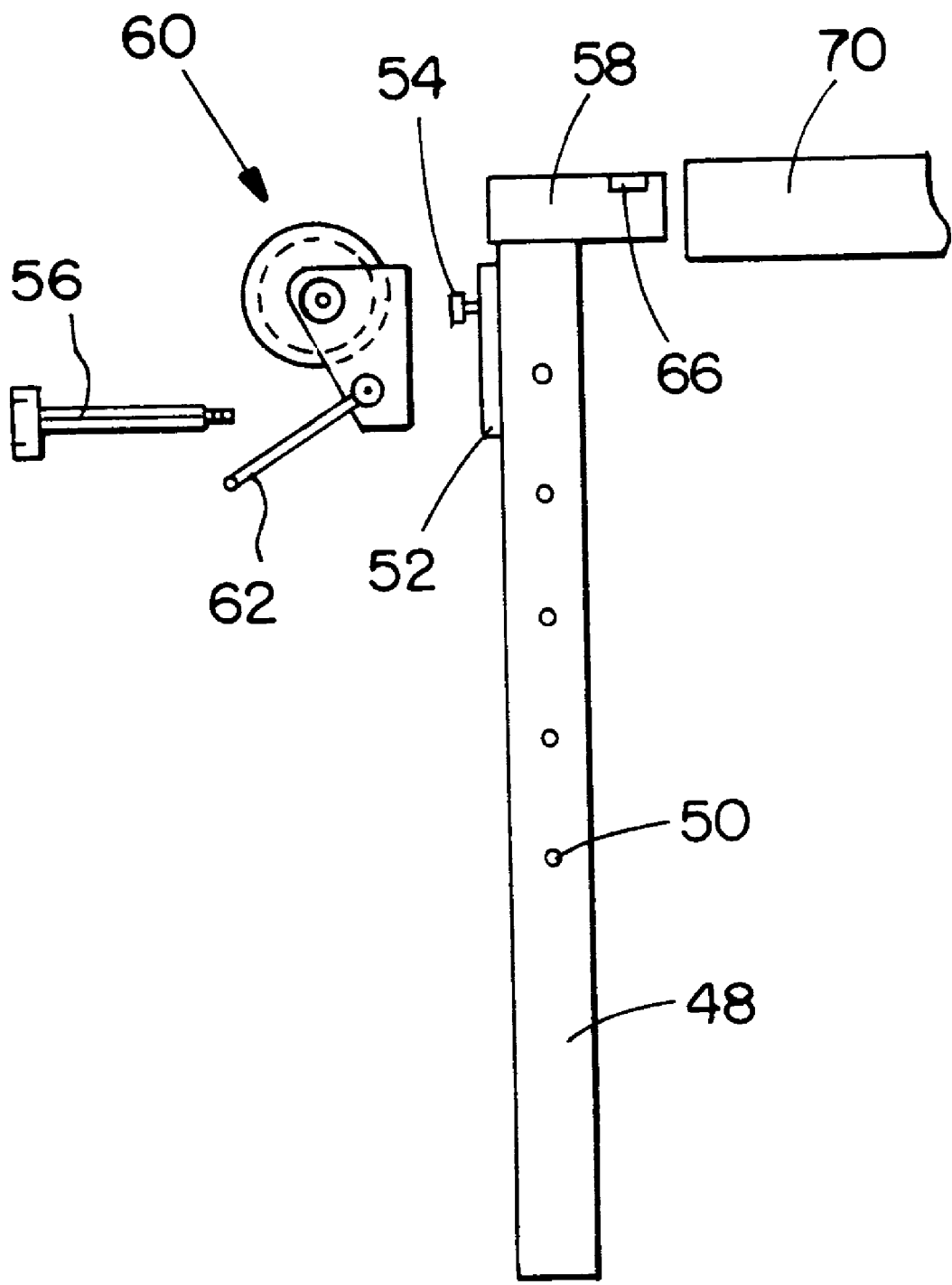
FIG. 4 illustrates the hoist of FIG. 1 in a partially disassembled state.

As illustrated in FIG. 4, support member 48 includes coupler 58 on the upper end thereof. In a preferred embodiment, coupler 58 is welded to support member 48 although other suitable methods of attaching coupler 58 to support member 48 can be used in accordance with the present invention. Support member 48 includes a bracket 52, which can be welded thereon, and a projection 54, such as a bolt head, for mounting winch assembly 60. As understood by one skilled in the art, the winch assembly 60 can be removably attached to bracket 52 by inserting projection 54 through an oblong hole in the winch assembly wherein the winch is slid down, and thereafter a locking member 56 insertable through a threaded portion of bracket 52 removably secures the winch assembly to the support member 48. The winch assembly 60 includes a crank 62 for causing rotation of the winch Attachable to coupler 58 is boom member 70 which slides over coupler 58 and secured thereto by a handle lock 64. Handle lock 64 includes an externally threaded member which threadedly engages a nut 66 welded to member 58.

Figures 5, 6:
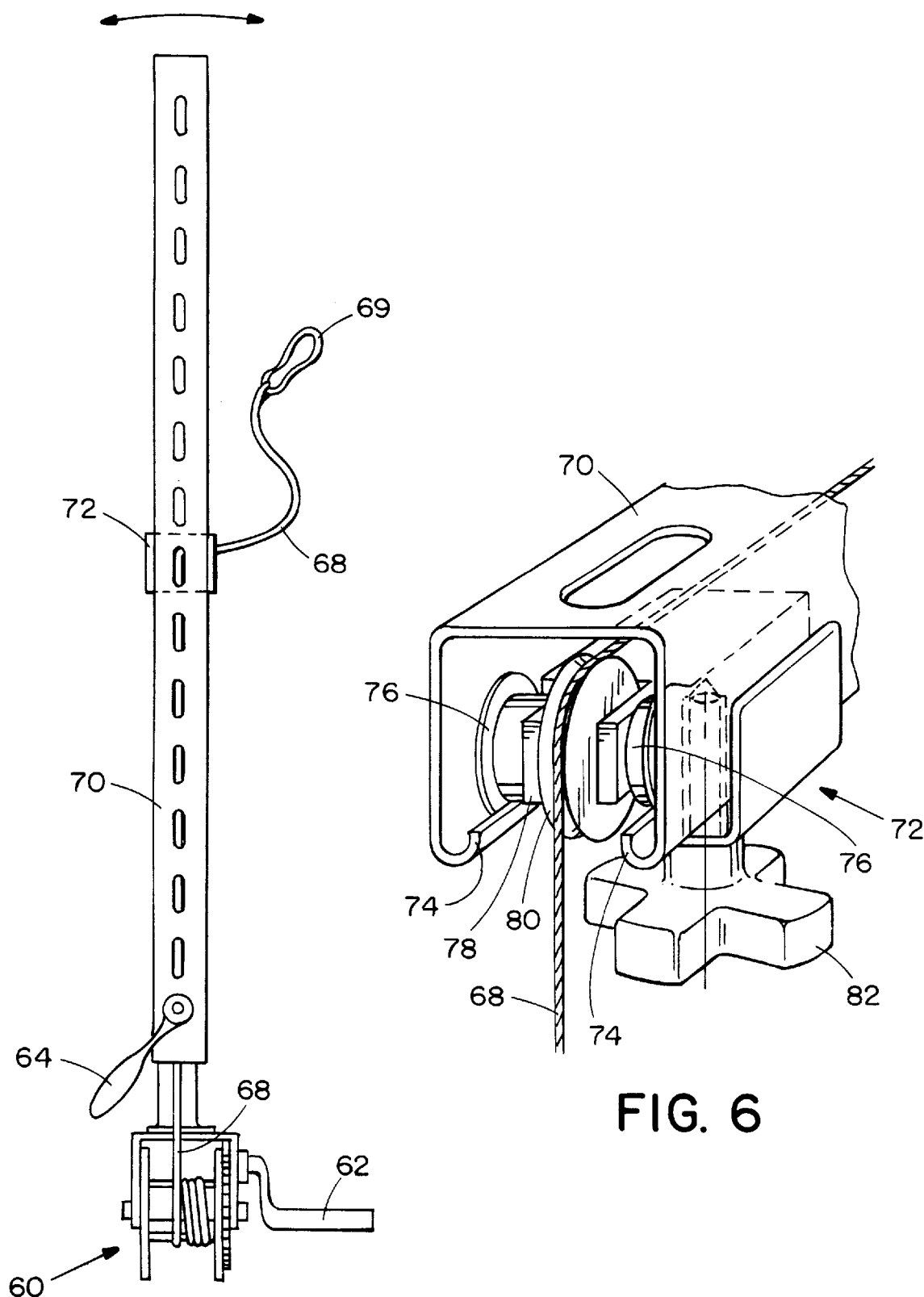
FIG. 5 is a top view of the hoist of FIG. 1, particularly illustrating the boom member.
FIG. 6 is a perspective view of the adjustable member shown in FIG. 1.

An adjustable member 72, as particularly illustrated in FIG. 6, is guidably supported by a boom member 70 to adjust the effective length thereof. Adjustable member 70 travels along the longitudinal axis of the boom member and is supported by bearings 76, which ride along tracks 74 of the boom member. Bearings 76 are supported by member 78 which includes a bifurcated projection which rotatably supports a U-shaped wheel 80 which guides a cable 68 connected to the winch assembly 60. A handle member 82 threadedly engages member 76 to secure the adjustable member 72 in a desired position along the boom member 70. A hook 69 can be provided on the end of cable 68 for attaching to the load desired to be loaded or unloaded from the vehicle. In a preferred embodiment of the present invention, cable 68 comprises an aircraft cable.

Because the present invention breaks down (i.e., disassembles), it allows the frailest operator to easily use the hoist. Accordingly, in a preferred embodiment of the present invention, member 32 weighs 8 lbs., support member 48 weighs 7 lbs., winch assembly 60 weighs 5 lbs, and boom member 70 weighs 6 lbs. In this manner, no single item weighs more than 8 lbs, and yet the assembled hoist has a significant load carrying capacity of up to about 155 pounds.

The operation of hoist 10 will now be described. The operator first assembles the hoist 10 by either inserting hitch member 20 into hitch pipe 13 and inserting member 32 into the shoulder member 26 or the operator can insert member 32 into a hole in a bumper. In either case, handle lock 38 is employed to secure member 32 substantially vertically. Flange 44 is next positioned on flange 40, and support member is inserted through member 44 and into member 32. The height of support member 48 is determined by which hole 50 the pin 46 is inserted into. If the operator wishes to prevent rotation of the support member about its longitudinal axis, locking pin 36 can be employed. The operator then attaches the winch assembly 60 onto bracket 52 of the support member and secure it thereto by using locking member 56. Boom member 70 is placed over member 58 and secured thereto in a substantially horizontal manner by handle lock 64. The operator then inserts cable 68 through member 58 and through the boom member 70 and over wheel 80. The hoist 10 is now assembled.

The operator then attaches the load to the cable 68, for example, with hook 69 and by rotating crank 62 can easily lift a load off the ground. The operator can then push boom member 70 around so as to unload the load into the vehicle. The same process applies when unloading an object from the vehicle. Because adjustable member 72 travels along boom member 70, the load can be unloaded where desired and loaded from vehicle at a desired position.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A knock-down, portable hoist, comprising:
   a first member insertable into a trailer hitch pipe of a vehicle;
   a second member attachable and supported substantially vertically by the first member, the second member including an externally threaded bolt insertable through a hole in the first member;
   a first handle lock having an internally threaded portion for threadedly engaging the external threads of the bolt for removably securing the second member to the first member;
   a third member insertable into and rotatably supported substantially vertically by the second member such that the third member is rotatable about its longitudinal axis;
   a pin insertable through the third member for adjusting the height of the third member;
   an interface member that supports the weight of the third member on the second member, the interface member removably securing the pin;
   a boom member removably attachable directly to the third member such that the boom member is substantially horizontal, the boom member guidably supporting an adjustable member movable along the longitudinal axis of the boom member;
   a second handle lock having an externally threaded member for threadedly engaging an internally threaded member of the third member to removably attach the boom member to the third member;
   a hand-crankable winch assembly removably attachable directly to the third member for winding/unwinding a cable attached thereto, the cable being insertable through the boom member and through the adjustable member for raising and lowering loads attached thereto; and
   a hand-operable locking member for removably securing the winch assembly to the third member.

2. The hoist of claim 1, wherein the first member includes a rectangular cross section insertable into a rectangular cross section of the trailer hitch pipe.

3. The hoist of claim 1, further comprising a locking pin for preventing rotation of the third member about its longitudinal axis.

4. The hoist of claim 3, wherein the second member includes a storage hole for storing the locking pin when the locking pin is not being used.

5. The hoist of claim 1, wherein the adjustable member is clampable along the longitudinal axis of the boom member.

6. The hoist of claim 1, wherein the adjustable member includes a wheel to guidably support the cable.

7. The hoist of claim 1, wherein:

the boom member includes a pair of tracks positioned along the longitudinal axis thereof; and the adjustable member includes a pair of opposed bearings which ride along the tracks, the tracks guidably supporting the adjustable member.

8. A knock-down, portable hoist, comprising:

a first member attachable to a support member, the first member supported substantially vertically by the support member, the first member including an externally threaded bolt insertable through a hole in the support member;

a first handle lock having an internally threaded portion for threadedly engaging the external threads of the bolt for removably securing the first member to the support member;

a second member insertable into and rotatably supported substantially vertically by the first member such that the second member is rotatable about its longitudinal axis;

a pin insertable through the second member for adjusting the height of the second member;

an interface member that supports the weight of the second member on the first member, the interface member removably securing the pin;

a boom member removably attachable directly to the second member such that the boom member is substantially horizontal, the boom member guidably supporting an adjustable member movable along the longitudinal axis of the boom member;

a second handle lock having an externally threaded member for threadedly engaging an internally threaded member of the second member to removably attach the boom member to the second member;

a hand-crankable winch assembly removably attachable directly to the second member for winding/unwinding a cable attached thereto, the cable being insertable through the boom member and through the adjustable member for raising and lowering loads attached thereto; and a hand-operable locking member for removably securing the winch assembly to the second member.

9. The hoist of claim 8, wherein the support member is a bumper of a vehicle.

10. The hoist of claim 8, further comprising a locking pin for preventing rotation of the second member about its longitudinal axis.

11. The hoist of claim 10, wherein the first member includes a storage hole for storing the locking pin when the locking pin is not being used.

12. The hoist of claim 8, wherein the adjustable member is clampable along the longitudinal axis of the boom member.

13. The hoist of claim 8, wherein the adjustable member includes a wheel to guidably support the cable.

14. The hoist of claim 8, wherein:

the boom member includes a pair of tracks positioned along the longitudinal axis thereof; and the adjustable member includes a pair of opposed bearings which ride along the tracks, the tracks guidably supporting the adjustable member.

15. A knock-down, portable hoist, comprising:

a first member attachable to a support member, the first member supported substantially vertically by the support member, the first member including an externally threaded bolt insertable through a hole in the support member;

a first handle lock having an internally threaded portion for threadedly engaging the external threads of the bolt for removably securing the first member to the support member;

a second member insertable into and rotatably supported substantially vertically by the first member such that the second member is rotatable about its longitudinal axis;

a pin insertable through the second member for adjusting the height of the second member;

an interface member that supports the weight of the second member on the first member, the interface member removably securing the pin;

a locking pin insertable through the second member for adjusting the height of the second member relative to the first member;

a boom member removably attachable directly to the second member such that the boom member is substantially horizontal, the boom member guidably supporting an adjustable member movable along the longitudinal axis of the boom member;

a second handle lock having an externally threaded member for threadedly engaging an internally threaded member of the second member to removably attach the boom member to the second member;

winch means connectable to the second member for winding/unwinding a cable attached thereto, the cable being insertable through the boom member and through the adjustable member for raising and lowering loads attached thereto; and a hand-operable locking member for removably securing the winch means to the second member.

* * * * *